United States Patent
Saito et al.

(10) Patent No.: US 9,422,974 B2
(45) Date of Patent: Aug. 23, 2016

(54) FLUID BEARING APPARATUS INCLUDING DYNAMIC PRESSURE GROOVES WITH STRIATIONS, SPINDLE MOTOR, AND DISK DRIVE APPARATUS

(71) Applicant: Nidec Corporation, Kyoto (JP)

(72) Inventors: Kazuyoshi Saito, Kyoto (JP); Mitsuo Kodama, Kyoto (JP); Junya Mizukami, Kyoto (JP); Yuichi Shigematsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 14/822,939

(22) Filed: Aug. 11, 2015

(65) Prior Publication Data
US 2016/0153490 A1   Jun. 2, 2016

(30) Foreign Application Priority Data

Dec. 1, 2014  (JP) ................................ 2014-243090

(51) Int. Cl.
| | |
|---|---|
| G11B 19/20 | (2006.01) |
| F16C 17/10 | (2006.01) |
| H02K 7/08 | (2006.01) |
| F16C 32/06 | (2006.01) |

(52) U.S. Cl.
CPC .......... *F16C 17/107* (2013.01); *F16C 32/0633* (2013.01); *F16C 32/0659* (2013.01); *G11B 19/2036* (2013.01); *H02K 7/086* (2013.01)

(58) Field of Classification Search
CPC ............ G11B 19/2009; G11B 19/2036; F16C 32/0633; F16C 32/0659; F16C 17/107
USPC ...................... 360/98.07, 99.08; 384/112, 120
See application file for complete search history.

(56) References Cited

U.S. PATENT DOCUMENTS

| | | | | |
|---|---|---|---|---|
| 8,773,815 | B2* | 7/2014 | Aoshima | F16C 33/107 310/90 |
| 2005/0025402 | A1* | 2/2005 | Miyajima | F16C 17/026 384/100 |
| 2005/0025405 | A1* | 2/2005 | Tamaoka | F16C 17/107 384/107 |
| 2006/0093245 | A1* | 5/2006 | Han | F16C 17/045 384/121 |
| 2007/0292060 | A1* | 12/2007 | Kusaka | F16C 17/02 384/107 |
| 2011/0080673 | A1 | 4/2011 | Aoshima et al. | |

(Continued)

FOREIGN PATENT DOCUMENTS

| | | |
|---|---|---|
| JP | 2001-012455 A | 1/2001 |
| JP | 2001-341002 A | 12/2001 |

(Continued)

*Primary Examiner* — Jefferson Evans
(74) *Attorney, Agent, or Firm* — Keating & Bennett, LLP

(57) ABSTRACT

A fluid bearing apparatus includes a stationary member and a rotating member. A bearing surface of the stationary member and a bearing surface of the rotating member are arranged opposite to each other with a minute gap intervening therebetween. A lubricating fluid is arranged in the minute gap. At least one of the bearing surfaces includes a dynamic pressure groove, and a plurality of striations defined in a bottom portion of the dynamic pressure groove. Each of the dynamic pressure groove and the striations is arranged to extend in a direction at an angle greater than 0° to a circumferential direction. An angle defined between each striation and the circumferential direction is equal to or smaller than an angle defined between the dynamic pressure groove and the circumferential direction. Thus, an improvement in a force of dynamic pressure at the dynamic pressure groove is achieved.

14 Claims, 14 Drawing Sheets

(56) References Cited

U.S. PATENT DOCUMENTS

| | | |
|---|---|---|
| 2013/0148918 A1 | 6/2013 | Aoshima et al. |
| 2013/0235489 A1 | 9/2013 | Aoshima |
| 2013/0336604 A1* | 12/2013 | Noda ................ F16C 32/0633 384/107 |
| 2014/0259642 A1 | 9/2014 | Aoshima |
| 2014/0317911 A1* | 10/2014 | Aoshima ............ G11B 25/043 29/603.03 |

FOREIGN PATENT DOCUMENTS

| | | |
|---|---|---|
| JP | 2005-007560 A | 1/2005 |
| JP | 2010-131732 A | 6/2010 |

* cited by examiner

US 9,422,974 B2

FLUID BEARING APPARATUS INCLUDING DYNAMIC PRESSURE GROOVES WITH STRIATIONS, SPINDLE MOTOR, AND DISK DRIVE APPARATUS

BACKGROUND OF THE INVENTION

1. Field of the Invention

The present invention relates to a fluid bearing apparatus, a spindle motor, and a disk drive apparatus.

2. Description of the Related Art

Spindle motors arranged to rotate disks are typically installed in hard disk apparatuses and optical disk apparatuses. Such a spindle motor includes a stationary portion fixed to a housing of the apparatus, and a rotating portion arranged to rotate while supporting the disk(s). The spindle motor is arranged to produce a torque by magnetic flux generated between a stator and a magnet, whereby the rotating portion is caused to rotate with respect to the stationary portion. The stationary portion and the rotating portion of the spindle motor are joined to each other through a fluid bearing. A known spindle motor including a fluid bearing is described, for example, in JP-A 2010-131732. The spindle motor described in JP-A 2010-131732 includes a dynamic pressure bearing including a lubricating oil.

In a fluid bearing of this type, dynamic pressure grooves are sometimes defined by a cutting process. If the dynamic pressure grooves are defined by the cutting process, cut marks in the shape of grooves due to a cutting tool are defined in each of the dynamic pressure grooves. In the dynamic pressure bearing described in JP-A 2010-131732, line grooves, which are cut marks due to a cutting tool, are defined along a circumferential direction.

Once a rotating portion starts rotating with respect to a stationary portion in the fluid bearing, a fluid moves in each dynamic pressure groove obliquely with respect to the circumferential direction, moving from a low dynamic pressure area to a high dynamic pressure area along the dynamic pressure groove. Accordingly, in the dynamic pressure bearing described in JP-A 2010-131732, recesses and projections which define the line grooves extending in the circumferential direction hinder an axial movement of the fluid, which may make it difficult to improve a force of dynamic pressure.

SUMMARY OF THE INVENTION

A fluid bearing apparatus according to a preferred embodiment of the present invention includes a stationary member including a bearing surface, and a rotating member arranged to rotate about a rotation axis with respect to the stationary member, and including a bearing surface. The bearing surface of the stationary member and the bearing surface of the rotating member are arranged opposite to each other with a minute gap intervening therebetween, a lubricating fluid being arranged in the minute gap. At least one of the bearing surfaces includes a dynamic pressure groove, and a plurality of striations defined in a bottom portion of the dynamic pressure groove. Each of the dynamic pressure groove and the plurality of striations is arranged to extend in a direction at an angle greater than 0° to a circumferential direction. An angle defined between each striation and the circumferential direction is equal to or smaller than an angle defined between the dynamic pressure groove and the circumferential direction.

The fluid bearing apparatus according to the above preferred embodiment of the present invention is able to achieve an improvement in a force of dynamic pressure at the dynamic pressure groove.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that an axial direction is a vertical direction, and that a side on which a top cover is arranged with respect to a base plate is an upper side, and the shape of each member or portion and relative positions of different members or portions will be described based on the above assumptions. It should be noted, however, that the above definitions of the vertical direction and the upper side are not meant to restrict in any way the orientation of a fluid bearing apparatus or a spindle motor according to any preferred embodiment of the present invention when in use.

Figure 1:
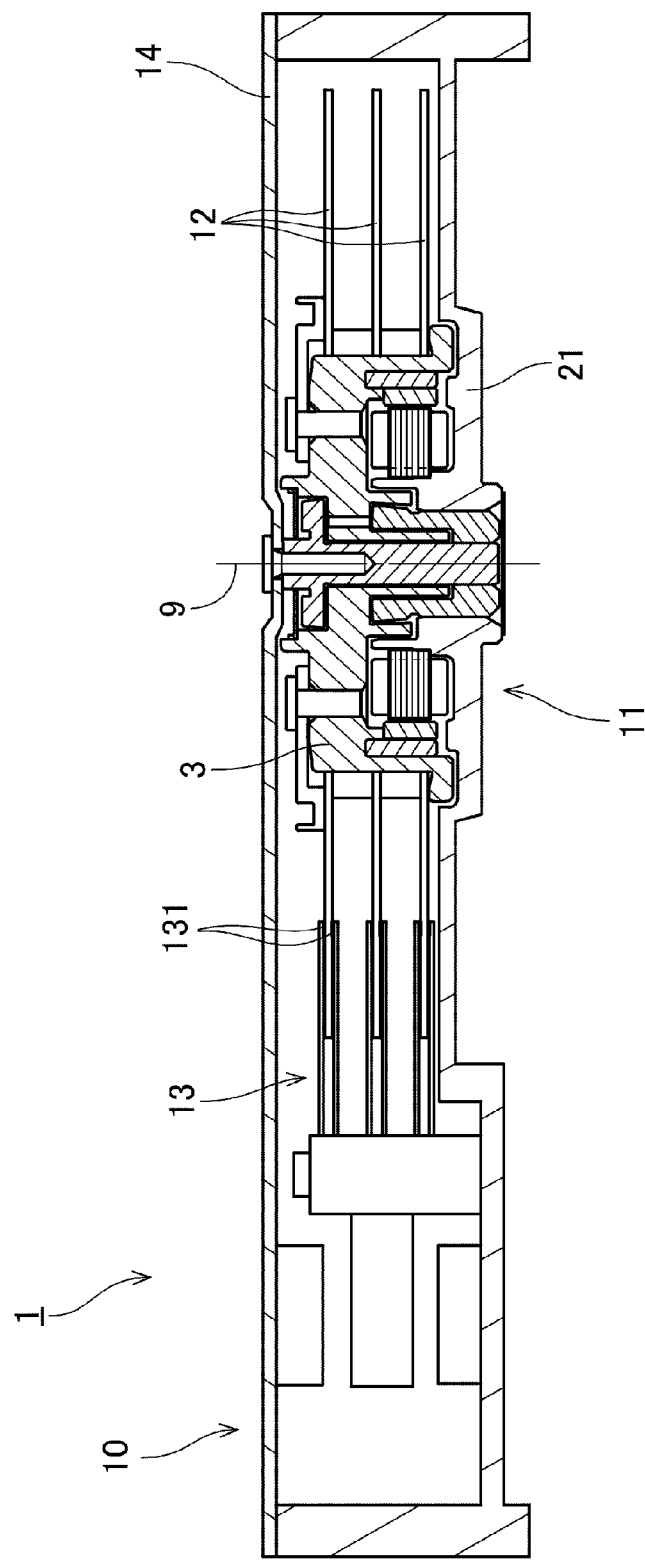
FIG. 1 is a vertical cross-sectional view of a disk drive apparatus according to a preferred embodiment of the present invention.

FIG. 1 is a vertical cross-sectional view of a disk drive apparatus 1 in which a spindle motor 11 according to a first preferred embodiment of the present invention is installed. The disk drive apparatus 1 is arranged to rotate magnetic disks 12, each of which includes a circular hole in a center thereof, to perform reading and writing of information from or to the magnetic disks 12. As illustrated in FIG. 1, the disk drive apparatus 1 includes the spindle motor 11, the magnetic disks 12, which are three in number, an access portion 13, and a top cover 14.

The spindle motor 11 is arranged to rotate the three magnetic disks 12 about a central axis 9 while supporting the three magnetic disks 12. The spindle motor 11 includes a base plate 21 arranged to extend perpendicularly to the central axis 9. An upper side of the base plate 21 is covered with the top cover 14. A rotating portion 3 of the spindle motor 11, the three magnetic disks 12, and the access portion 13 are accommodated inside a case 10 defined by the base plate 21 and the top cover 14. The access portion 13 is arranged to move heads 131 along recording surfaces of the magnetic disks 12 to perform the reading and the writing of information from or to the magnetic disks 12.

Note that the number of magnetic disks 12 included in the disk drive apparatus 1 may alternatively be one, two, or more than three. Also note that the access portion 13 may be arranged to perform at least one of the reading and the writing of information from or to the magnetic disks 12.

An interior space of the case 10 is preferably a clean space with extremely little dirt or dust. According to the present preferred embodiment, the interior of the case 10 is filled with a clean air. Note, however, that the interior of the case 10 may alternatively be filled with a helium gas, a hydrogen gas, or a nitrogen gas instead of air. Also note that the interior of the case 10 may alternatively be filled with a mixture of any of these gases and air.

Figure 2:
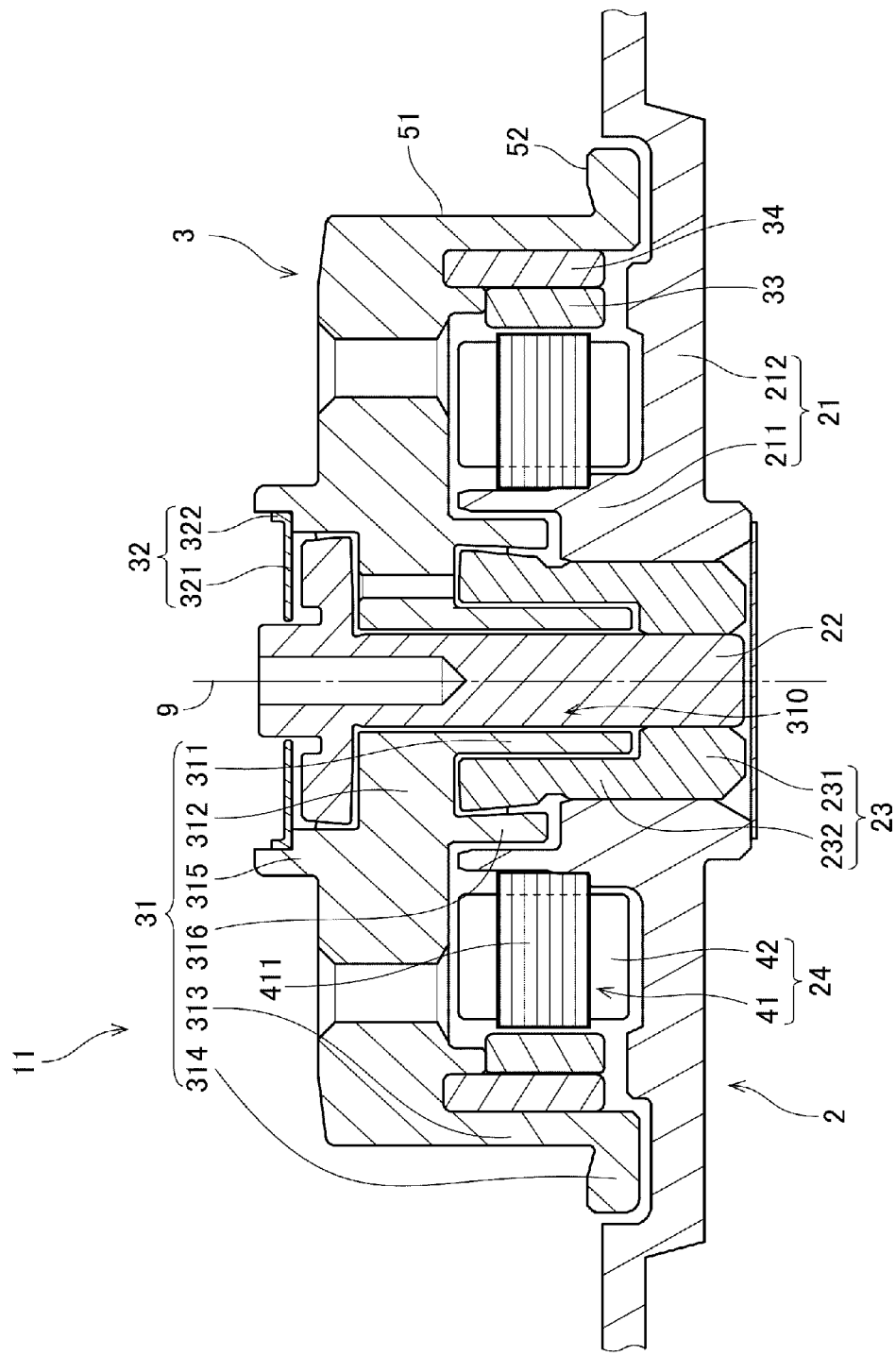
FIG. 2 is a vertical cross-sectional view of a spindle motor according to the above preferred embodiment of the present invention.

Next, the structure of the spindle motor 11 used in the disk drive apparatus 1 will now be described in more detail below. FIG. 2 is a vertical cross-sectional view of the spindle motor 11. As illustrated in FIG. 2, the spindle motor 11 includes a stationary portion 2 and the rotating portion 3. The stationary portion 2 is arranged to be stationary relative to the case 10 of the disk drive apparatus 1. The rotating portion 3 is supported to be rotatable with respect to the stationary portion 2.

The stationary portion 2 according to the present preferred embodiment includes the base plate 21, a shaft 22, a lower annular member 23, and a stator 24.

The base plate 21 is arranged to extend substantially perpendicularly to the central axis 9 below the stator 24, a rotating member 31 described below, a magnet 33 described below, the magnetic disks 12, and the access portion 13. A metal, such as an aluminum alloy, for example, is used as a material of the base plate 21. As illustrated in FIG. 2, the base plate 21 includes a cylindrical holder portion 211 and a plate portion 212. The cylindrical holder portion 211 is arranged to extend in an axial direction to substantially assume the shape of a cylinder radially inside of the stator 24. The plate portion 212 is arranged to extend radially outward from the cylindrical holder portion 211.

The shaft 22 is arranged to extend along the central axis 9. A metal, such as stainless steel, for example, is used as a material of the shaft 22. As illustrated in FIG. 1, an upper end portion of the shaft 22 is fixed to the top cover 14 of the disk drive apparatus 1. Meanwhile, a lower end portion of the shaft 22 is fixed to the cylindrical holder portion 211 of the base plate 21 through the lower annular member 23.

Figure 3:
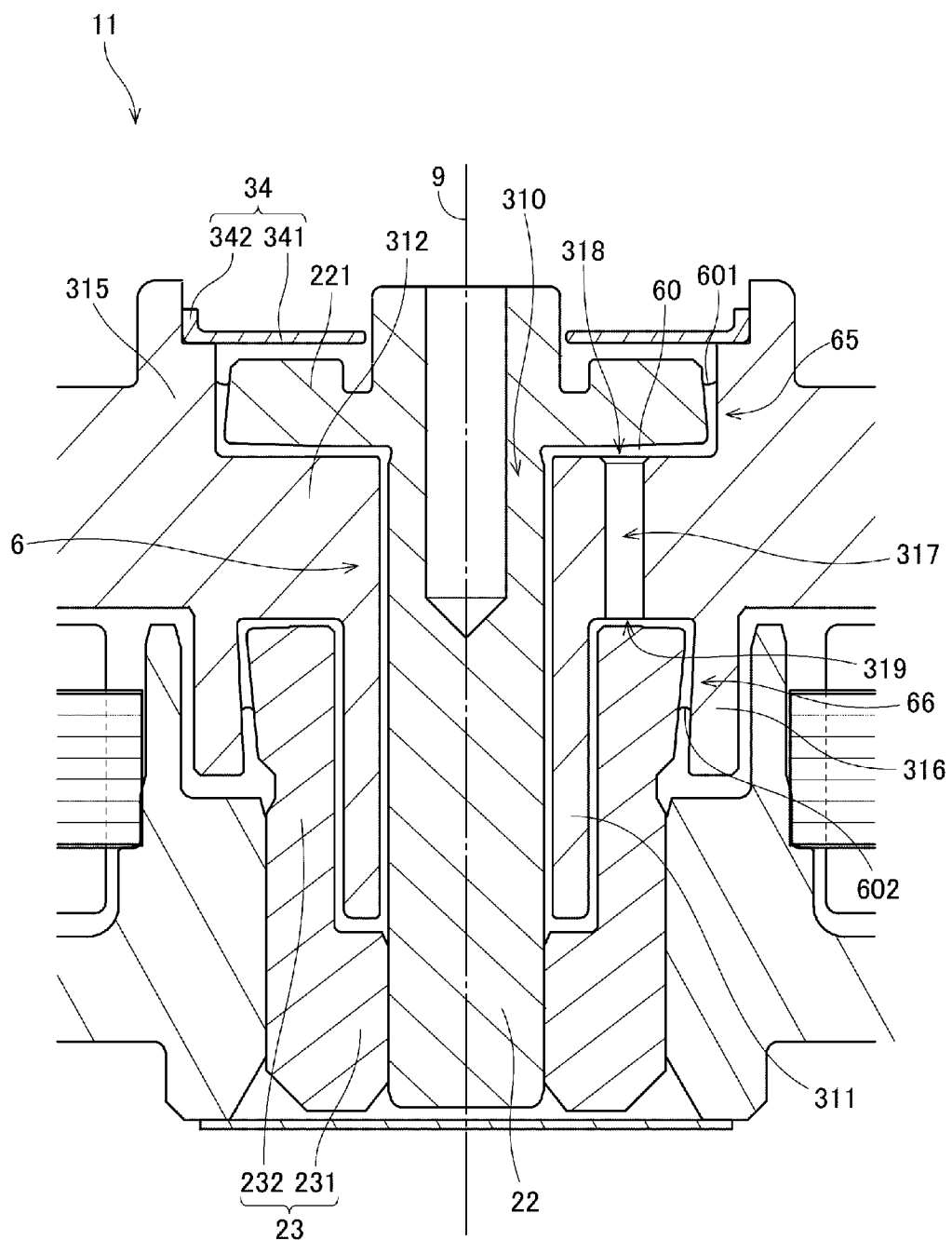
FIG. 3 is a partial vertical cross-sectional view of the spindle motor according to the above preferred embodiment of the present invention.

As illustrated in FIG. 3, the shaft 22 includes an upper annular portion 221. The upper annular portion 221 is arranged to project radially outward in the vicinity of the upper end portion of the shaft 22. The upper annular portion 221 is arranged between an upper surface of a connection portion 312 described below and a lower surface of a cap plate portion 321 described below. The upper annular portion 221 according to the present preferred embodiment is a portion of a member constituting the shaft 22. Note, however, that the upper annular portion 221 and the shaft 22 may be defined by separate members.

The lower annular member 23 is arranged below the upper annular portion 221, and is arranged to surround the shaft 22 and an inner cylindrical portion 311 of the rotating member 31 described below in an annular shape. A metal, such as copper or brass, for example, is used as a material of the lower annular member 23. The lower annular member 23 is fixed to the shaft 22 through press fitting, shrink fitting, an adhesive, or the like. Note, however, that the shaft 22 and the lower annular member 23 may alternatively be defined by a single continuous monolithic member.

The lower annular member 23 according to the present preferred embodiment includes a bottom portion 231 and a wall portion 232. The bottom portion 231 is arranged to extend in an annular shape below the inner cylindrical portion 311 of the rotating member 31 described below. An inner circumferential surface of the bottom portion 231 is fixed to an outer circumferential surface of the shaft 22. The wall portion 232 is arranged to extend upward from the bottom portion 231 to substantially assume the shape of a cylinder radially outside of the inner cylindrical portion 311. An outer circumferential surface of the wall portion 232 is fixed to an inner circumferential surface of the cylindrical holder portion 211.

The stator 24 is an armature of the spindle motor 11. The stator 24 includes a stator core 41 and a plurality of coils 42. The stator core 41 is, for example, defined by laminated steel sheets, that is, electromagnetic steel sheets, such as silicon steel sheets, placed one upon another in the axial direction. The stator core 41 is fixed to an outer circumferential surface of the cylindrical holder portion 211. In addition, the stator core 41 includes a plurality of teeth 411 arranged to project radially outward. The coils 42 are a collection of conducting wires wound around the teeth 411. The teeth 411 and the coils 42 are arranged in an annular shape with the central axis 9 as a center.

The rotating portion 3 according to the present preferred embodiment includes the rotating member 31, a cap 32, the magnet 33, and a yoke 34.

The rotating member 31 is an annular member arranged around the shaft 22. The rotating member 31 according to the present preferred embodiment is a base material made of stainless steel and whose surface is plated with nickel. Note that, instead of stainless steel, a metal, such as aluminum or copper, for example, may be used as a material of the rotating member 31.

The rotating member 31 includes a central through hole 310 arranged to pass therethrough in the vertical direction. At least a portion of the shaft 22 is accommodated in the central through hole 310. The rotating member 31 according to the present preferred embodiment includes the inner cylindrical portion 311, the connection portion 312, an outer cylindrical portion 313, a disk mount portion 314, an upper projecting portion 315, and a lower projecting portion 316.

The inner cylindrical portion 311 is arranged to surround the shaft 22 in an annular shape below the upper annular portion 221 and above the lower annular member 23. The connection portion 312 is arranged to extend radially outward from an upper end portion of the inner cylindrical portion 311 to substantially assume the shape of a disk. The outer cylindrical portion 313 is arranged to extend downward from a radially outer end portion of the connection portion 312 to assume the shape of a tube. That is, the connection portion 312 is arranged to extend radially to join the inner cylindrical portion 311 and the outer cylindrical portion 313 to each other. The disk mount portion 314 is arranged to project further radially outward from a lower end portion of the outer cylindrical portion 313 to assume the shape of a ring.

A cylindrical outer circumferential surface 51 of the outer cylindrical portion 313 is fitted in the circular holes of the magnetic disks 12. An inner circumferential portion of each magnetic disk 12 is arranged to be in contact with at least a portion of the outer circumferential surface 51 of the outer cylindrical portion 313. The magnetic disks 12 are thus radially positioned. An upper surface 52 of the disk mount portion 314 is arranged to extend radially outward from the outer circumferential surface of the outer cylindrical portion 313. A lower surface of the lowermost magnetic disk 12 is arranged to be in contact with at least a portion of the upper surface 52 of the disk mount portion 314. The magnetic disks 12 are thus axially positioned.

As described above, according to the present preferred embodiment, the outer circumferential surface 51 of the outer cylindrical portion 313 defines a first disk support surface, while the upper surface 52 of the disk mount portion 314 defines a second disk support surface. The three magnetic disks 12 are supported by these first and second disk support surfaces.

The upper projecting portion 315 is arranged to extend upward from the upper surface of the connection portion 312 to assume the shape of a cylinder between the inner cylindrical portion 311 and the outer cylindrical portion 313. The upper projecting portion 315 is arranged radially outward of the upper annular portion 221. An inner circumferential surface of the upper projecting portion 315 includes a shoulder recessed radially outward. The lower projecting portion 316 is arranged to extend downward from a lower surface of the connection portion 312 to assume the shape of a cylinder between the inner cylindrical portion 311 and the outer cylindrical portion 313. The lower projecting portion 316 is arranged radially outward of the wall portion 232 of the lower annular member 23.

Although, according to the present preferred embodiment, the rotating member 31 is defined by a single monolithic member including a sleeve defining a portion of a fluid dynamic bearing, and a hub including the disk mount portion, the present invention is not limited to this. The rotating member 31 may alternatively be defined by two members, with the sleeve and the hub being separate from each other.

The cap 32 is a substantially disk-shaped member including a circular hole at a center thereof. The cap 32 may be made of either a metal or a resin. The cap 32 according to the present preferred embodiment includes the cap plate portion 321 and a cap projecting portion 322. The cap plate portion 321 is arranged to extend in an annular shape above the upper annular portion 221. An inner circumferential portion of the cap plate portion 321 is arranged radially opposite to the outer circumferential surface of the shaft 22 in the vicinity of the upper end portion of the shaft 22 with a slight gap intervening therebetween. The cap projecting portion 322 is arranged to project upward from a radially outer end portion of the cap plate portion 321 to substantially assume the shape of a cylinder.

A corner portion which is at a junction of the cap plate portion 321 and the cap projecting portion 322 is fitted to the shoulder of the upper projecting portion 315. An outer circumferential surface of the cap projecting portion 322 is fixed to the inner circumferential surface of the upper projecting portion 315 through, for example, an adhesive. Thus, the cap 32 is caused to rotate together with the rotating member 31 once the rotating member 31 starts rotating.

The magnet 33 is arranged radially outside of the stator 24. The magnet 33 is fixed to an inner circumferential surface of the outer cylindrical portion 313 through the yoke 34, which is made of a magnetic material. The magnet 33 according to the present preferred embodiment is annular in shape. A radially inner surface of the magnet 33 is arranged radially opposite to a radially outer end surface of each of the teeth 411 with a slight gap intervening therebetween. In addition, an inner circumferential surface of the magnet 33 includes north and south poles arranged to alternate with each other in a circumferential direction.

Note that a plurality of magnets may be used in place of the annular magnet 33. In the case where the plurality of magnets are used, the magnets are arranged in the circumferential direction such that north and south poles alternate with each other. Also note that the magnet 33 may alternatively be directly fixed to the inner circumferential surface of the outer cylindrical portion 313 without use of the yoke 34.

Once electric drive currents are supplied to the coils 42 in the spindle motor 11 as described above, magnetic flux is generated around each of the teeth 411. Then, interaction between the magnetic flux of the teeth 411 and magnetic flux of the magnet 33 produces a circumferential torque between the stationary portion 2 and the rotating portion 3, so that the rotating portion 3 is caused to rotate about the central axis 9 with respect to the stationary portion 2. The magnetic disks 12 supported by the rotating member 31 are caused to rotate about the central axis 9 together with the rotating portion 3.

Figure 4:
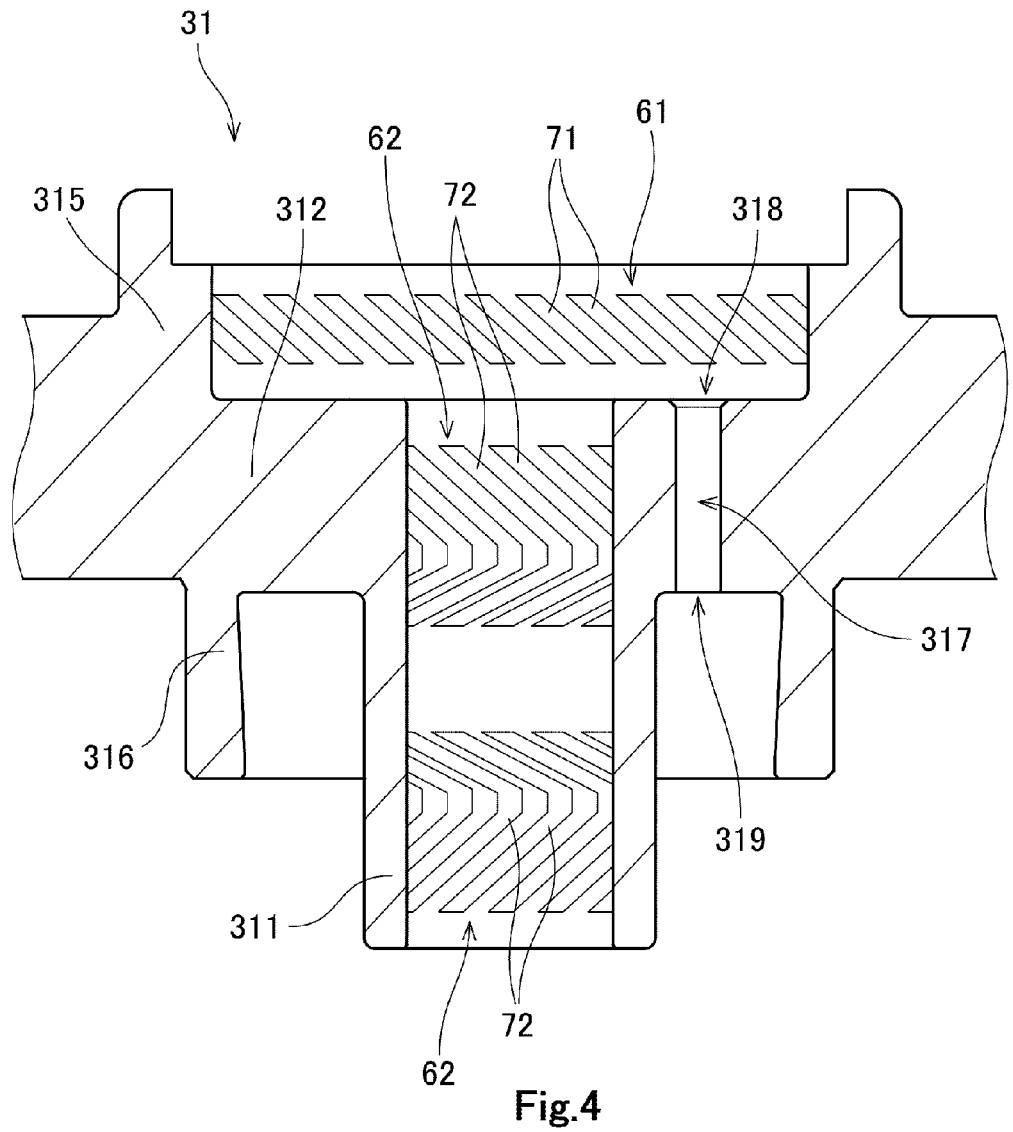
FIG. 4 is a vertical cross-sectional view of a sleeve according to the above preferred embodiment of the present invention.

Next, the structure of a fluid dynamic bearing 6 included in the spindle motor 11 will now be described below. FIG. 3 is a partial vertical cross-sectional view of the spindle motor 11, illustrating the fluid dynamic bearing 6 and its vicinity. FIG. 4 is a partial vertical cross-sectional view of the rotating member 31. As illustrated in FIG. 3, a lubricating fluid 60 is arranged to intervene between a combination of the shaft 22 and the lower annular member 23 and the rotating member 31. A polyolester oil or a diester oil, for example, is used as the lubricating fluid 60. The rotating member 31 is supported through the lubricating fluid 60 to be rotatable with respect to the combination of the shaft 22 and the lower annular member 23.

As described above, according to the present preferred embodiment, the fluid dynamic bearing 6, which is a fluid bearing apparatus, is defined by the combination of the shaft 22 and the lower annular member 23, which are components of the stationary portion 2, the rotating member 31, which is a component of the rotating portion 3, and the lubricating fluid 60, which is arranged to intervene therebetween. The rotating portion 3 is rotatably supported through the fluid dynamic bearing 6. That is, the combination of the shaft 22 and the lower annular member 23 defines a first bearing member, which is a stationary member, while the rotating member 31 defines a second bearing member, which is a rotating member.

As illustrated in FIG. 3, the lubricating fluid 60 includes an upper liquid surface 601 and a lower liquid surface 602. The upper liquid surface 601 is located between an outer circumferential surface of the upper annular portion 221 and the inner circumferential surface of the upper projecting portion 315. That is, according to the present preferred embodiment, the outer circumferential surface of the upper annular portion 221 and the inner circumferential surface of the upper projecting portion 315 are arranged to together define an upper seal portion 65 arranged to hold the upper liquid surface 601 of the lubricating fluid 60.

The upper seal portion 65 and the fluid dynamic bearing 6 are connected with each other. In the upper seal portion 65, the radial distance between the outer circumferential surface of the upper annular portion 221 and the inner circumferential surface of the upper projecting portion 315 is arranged to gradually increase with increasing height. The upper liquid surface 601 of the lubricating fluid 60 is accordingly attracted downward by surface tension to define a meniscus. A reduction in a leakage of the lubricating fluid 60 through the upper seal portion 65 is achieved by arranging the radial width of the upper seal portion 65 to gradually increase with increasing height to cause the upper liquid surface 601 to define the meniscus.

In addition, as illustrated in FIG. 4, the inner circumferential surface of the upper projecting portion 315 of the rotating member 31 includes a pumping groove array 61 arranged in a spiral pattern. The rotating member 31 is arranged to rotate in one direction with respect to the shaft 22 and the lower annular member 23 while the spindle motor 11 is running. At this time, the pumping groove array 61 induces a dynamic pressure in a portion of the lubricating fluid 60 which is present between the outer circumferential surface of the upper annular portion 221 and the inner circumferential surface of the upper projecting portion 315. The lubricating fluid 60 in the upper seal portion 65 is thus attracted downward by this dynamic pressure to achieve a further reduction in the leakage of the lubricating fluid 60 through the upper seal portion 65.

Meanwhile, the lower liquid surface 602 of the lubricating fluid 60 is located between the outer circumferential surface of the wall portion 232 of the lower annular member 23 and an inner circumferential surface of the lower projecting portion 316 of the rotating member 31. That is, according to the present preferred embodiment, the outer circumferential surface of the wall portion 232 and the inner circumferential surface of the lower projecting portion 316 are arranged to together define a lower seal portion 66 arranged to hold the lower liquid surface 602 of the lubricating fluid 60. The lower seal portion 66 and the fluid dynamic bearing 6 are connected with each other. In the lower seal portion 66, the radial distance between the outer circumferential surface of the wall portion 232 and the inner circumferential surface of the lower projecting portion 316 is arranged to gradually increase with decreasing height. The lower liquid surface 602 of the lubricating fluid 60 is accordingly attracted upward by capillary action to define a meniscus. A reduction in a leakage of the lubricating fluid 60 through the lower seal portion 66 is achieved by arranging the radial width of the lower seal portion 66 to gradually increase with decreasing height to cause the lower liquid surface 602 to define the meniscus.

As illustrated in FIG. 4, an inner circumferential surface of the inner cylindrical portion 311 and an inner circumferential surface of the connection portion 312 include upper and lower radial dynamic pressure groove arrays 62 each of which is arranged in a herringbone pattern.

The rotating member 31 is arranged to rotate in one direction with respect to the shaft 22 while the spindle motor 11 is running. At this time, the radial dynamic pressure groove arrays 62 induce a dynamic pressure in a portion of the lubricating fluid 60 which is present between the shaft 22 and the rotating member 31. The rotating member 31 is thus supported radially with respect to the shaft 22. Note that it is enough that the radial dynamic pressure groove arrays 62 should be defined in at least one of the outer circumferential surface of the shaft 22 and an inner circumferential surface of the rotating member 31.

Figure 5:
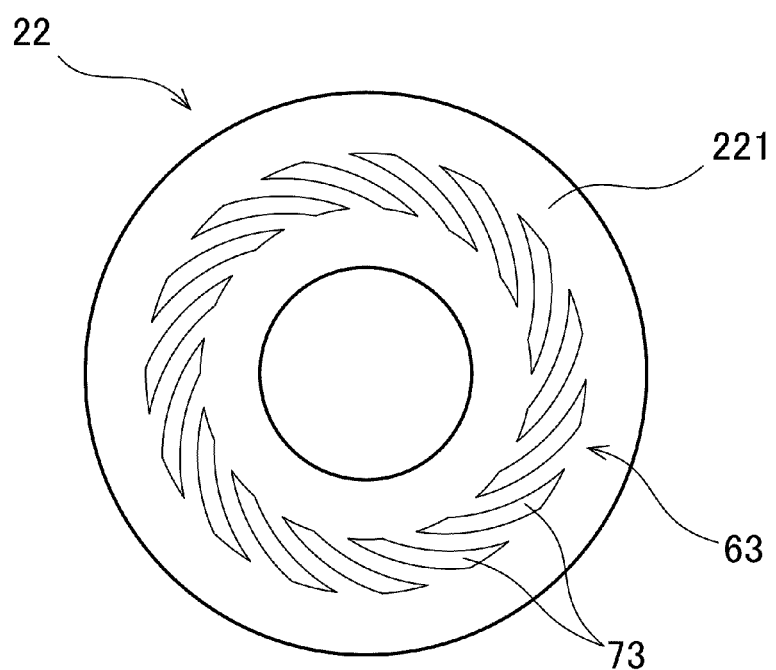
FIG. 5 is a bottom view of a shaft according to the above preferred embodiment of the present invention.
Figure 6:
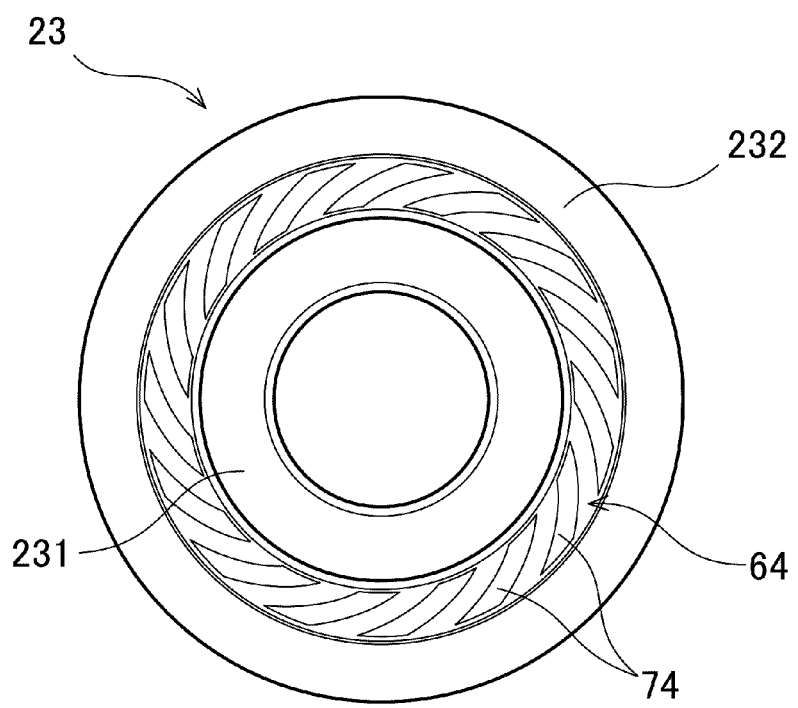
FIG. 6 is a top view of a lower annular member according to the above preferred embodiment of the present invention.

FIG. 5 is a bottom view of the shaft 22. As illustrated in FIG. 5, a lower surface of the upper annular portion 221 includes a first thrust dynamic pressure groove array 63 arranged in a spiral pattern. FIG. 6 is a top view of the lower annular member 23. As illustrated in FIG. 6, an upper surface of the wall portion 232 includes a second thrust dynamic pressure groove array 64 arranged in a spiral pattern.

The rotating member 31 is arranged to rotate in one direction with respect to the shaft 22 and the lower annular member 23 while the spindle motor 11 is running. At this time, the first thrust dynamic pressure groove array 63 induces a dynamic pressure in a portion of the lubricating fluid 60 which is present between the lower surface of the upper annular portion 221 and the upper surface of the connection portion 312. Meanwhile, the second thrust dynamic pressure groove array 64 induces a dynamic pressure in a portion of the lubricating fluid 60 which is present between the upper surface of the wall portion 232 and the lower surface of the connection portion 312. The rotating member 31 is thus supported axially with respect to the shaft 22 and the lower annular member 23.

Note that it is enough that the first thrust dynamic pressure groove array 63 should be defined in at least one of the lower surface of the upper annular portion 221 and a portion of the upper surface of the connection portion 312 which is opposed to the upper annular portion 221. Note that it is enough that the second thrust dynamic pressure groove array 64 should be defined in at least one of the upper surface of the wall portion 232 and a portion of the lower surface of the connection portion 312 which is opposed to the wall portion 232. Also note that each of the first and second thrust dynamic pressure groove arrays may be a groove array arranged in a herringbone pattern.

In addition, the rotating member 31 includes a communicating hole 317 in addition to the central through hole 310. The communicating hole 317 is arranged to pass through the connection portion 312 in the vertical direction radially outside of the central through hole 310 and radially inside of the upper projecting portion 315 and the lower projecting portion 316. That is, the communicating hole 317 is arranged to join an upper opening 318 defined in the upper surface of the connection portion 312 and a lower opening 319 defined in the lower surface of the connection portion 312 to each other in the axial direction. The communicating hole 317 is also filled with the lubricating fluid 60.

The lubricating fluid 60 is thus arranged to continuously fill a space extending from the upper seal portion 65 to the lower seal portion 66 through a gap between the shaft 22 and the rotating member 31 and the communicating hole 317. Therefore, the lubricating fluid 60 includes only the two liquid surfaces, the upper liquid surface 601 held by the upper seal portion 65 and the lower liquid surface 602 held by the lower seal portion 66. This contributes to reducing evaporation of the lubricating fluid 60.

Figure 7:
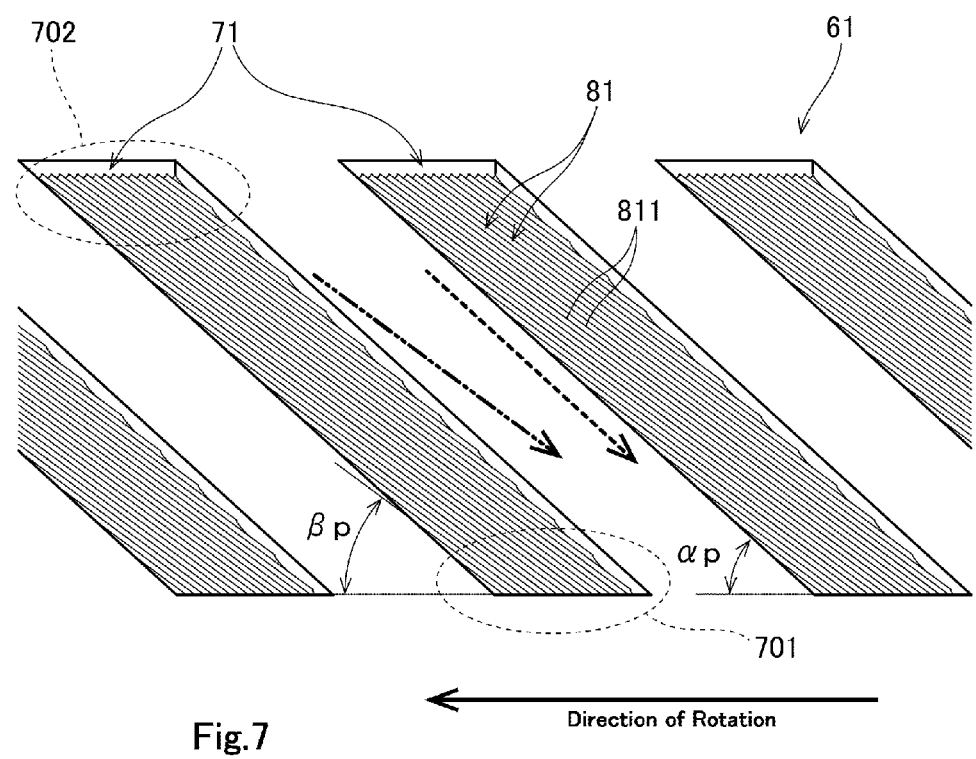
FIG. 7 is a perspective view illustrating a pumping groove array of the sleeve and its vicinity according to the above preferred embodiment of the present invention.
Figure 8:
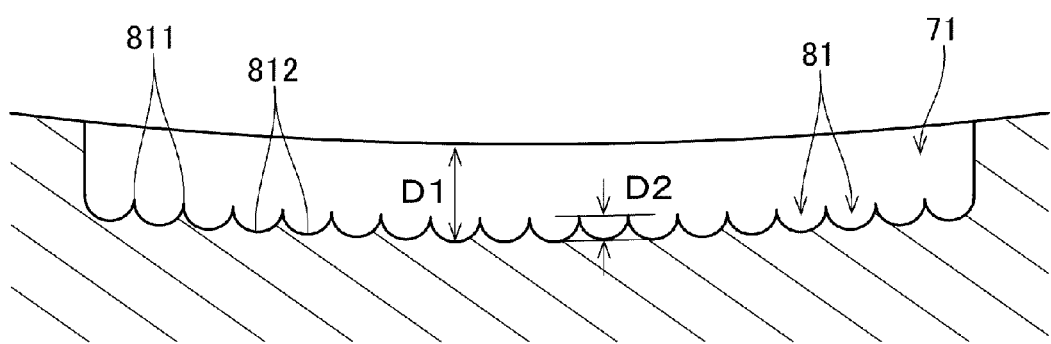
FIG. 8 is a horizontal cross-sectional view illustrating the pumping groove array of the sleeve and its vicinity according to the above preferred embodiment of the present invention.
Figure 9:
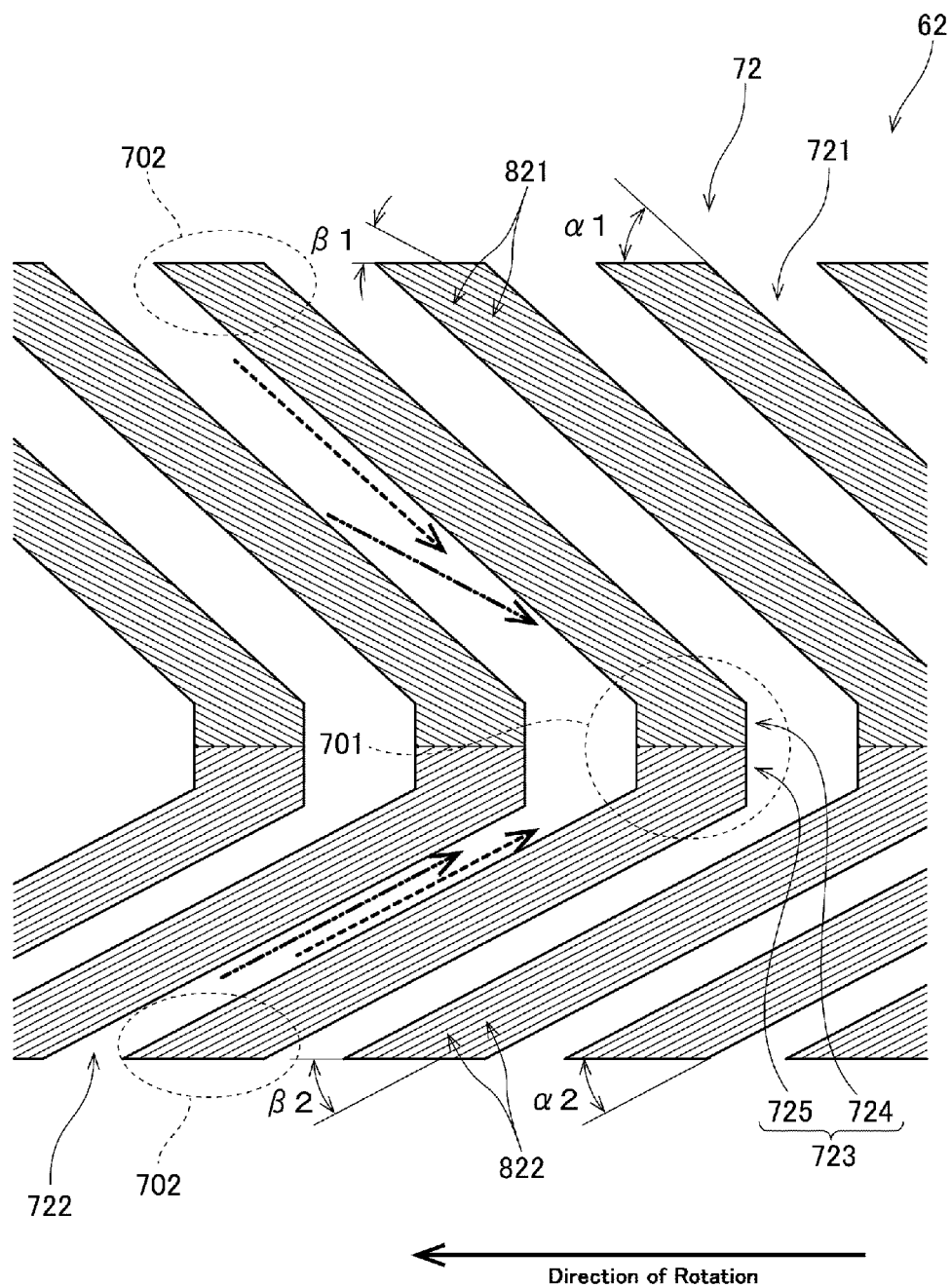
FIG. 9 is a side view illustrating a radial dynamic pressure groove array of the sleeve and its vicinity according to the above preferred embodiment of the present invention.
Figure 10:
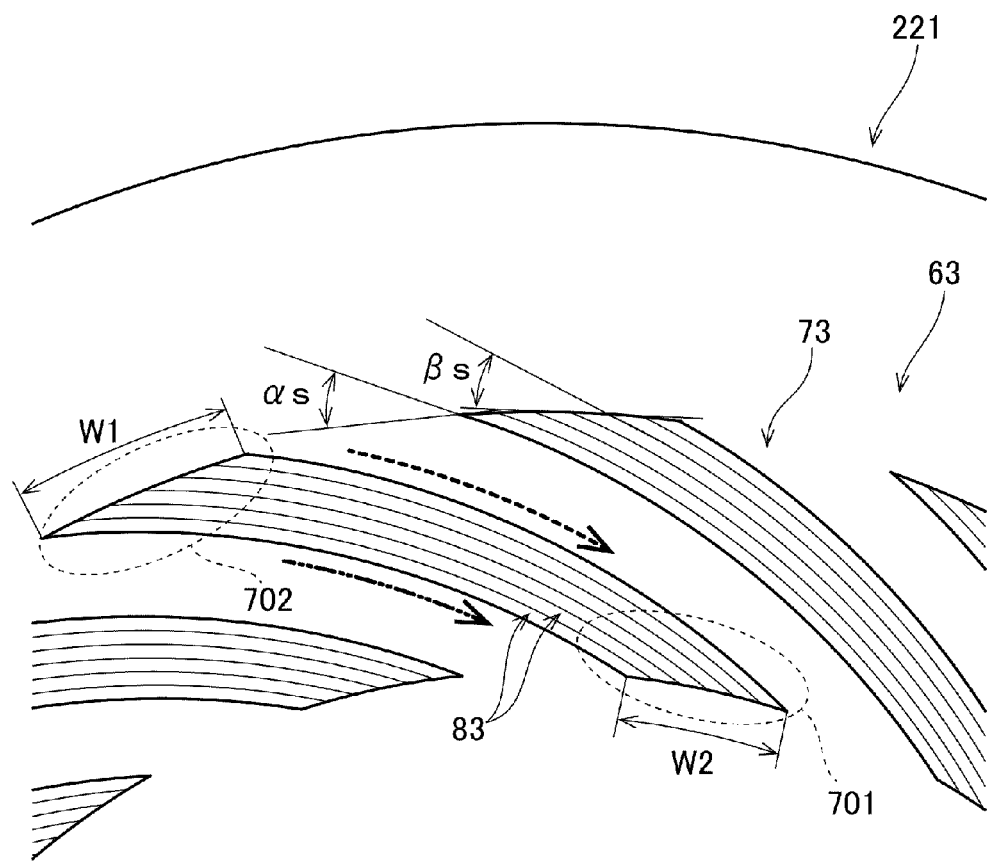
FIG. 10 is a partial bottom view of the shaft according to the above preferred embodiment of the present invention.

Next, detailed structures of dynamic pressure grooves 71, 72, 73, and 74 included in, respectively, the pumping groove array 61, the radial dynamic pressure groove arrays 62, the first thrust dynamic pressure groove array 63, and the second thrust dynamic pressure groove array 64 described above will now be described below. FIG. 7 is a diagram illustrating a portion of the inner circumferential surface of the rotating member 31 in the vicinity of the pumping groove array 61 when viewed from the direction of the central axis 9. FIG. 8 is a partial horizontal cross-sectional view of a portion of the rotating member 31 in the vicinity of the pumping groove array 61. FIG. 9 is a diagram illustrating a portion of the inner circumferential surface of the rotating member 31 in the vicinity of the radial dynamic pressure groove array 62 when viewed from the direction of the central axis 9. FIG. 10 is a partial bottom view of a portion of the upper annular portion 221 of the shaft 22 in the vicinity of the first thrust dynamic pressure groove array 63. Note that, in FIGS. 9 and 10, thin lines in each of the dynamic pressure grooves 72 and 73 represent edge portions of striations described below.

As described above, the fluid dynamic bearing 6 includes four types of dynamic pressure groove arrays: the pumping groove array 61, the radial dynamic pressure groove arrays 62, the first thrust dynamic pressure groove array 63, and the second thrust dynamic pressure groove array 64. As illustrated in FIGS. 4 to 6, these dynamic pressure groove arrays 61 to 64 are defined by a plurality of dynamic pressure grooves 71 to 74, respectively, arranged at substantially regular intervals in the circumferential direction. Specifically, the pumping groove array 61 includes a plurality of pumping dynamic pressure grooves 71. Each radial dynamic pressure groove array 62 includes a plurality of radial dynamic pressure grooves 72. The first thrust dynamic pressure groove array 63 includes a plurality of first thrust dynamic pressure grooves 73. The second thrust dynamic pressure groove array 64 includes a plurality of second thrust dynamic pressure grooves 74.

Each of the dynamic pressure grooves 71 to 74 is defined by a cutting process. Specifically, the inner circumferential surface of the rotating member 31, the lower surface of the upper annular portion 221 of the shaft 22, and the upper surface of the wall portion 232 of the lower annular member 23 are cut by using cutting tools to define, respectively, the pumping dynamic pressure grooves 71 and the radial dynamic pressure grooves 72, the first thrust dynamic pressure grooves 73, and the second thrust dynamic pressure grooves 74. Accordingly, cut marks in the shape of grooves due to the cutting tool are defined in each of the dynamic pressure grooves 71 to 74. Since the detailed structure of the second thrust dynamic pressure grooves 74 is similar to that of the first thrust dynamic pressure grooves 73, redundant descriptions will be omitted.

As illustrated in FIG. 7, a plurality of striations 81 are defined in a bottom portion of each pumping dynamic pressure groove 71. The striations 81 and striations 821, 822, and 83 described below are all cut marks due to the cutting tools, and are grooves extending obliquely with respect to the circumferential direction. Moreover, each of the striations 81, 821, 822, and 83 is a groove recessed in a depth direction of the dynamic pressure groove 71, 72, 73, or 74 in which the striation 81, 821, 822, or 83 is defined.

Each pumping dynamic pressure groove 71 is arranged to extend in a direction at an angle of $\alpha p[°]$, which is greater than $0[°]$, to the circumferential direction. Meanwhile, each striation 81 is arranged to extend in a direction at an angle of $\beta p[°]$, which is greater than $0[°]$ and equal to or smaller than $\alpha p[°]$, to the circumferential direction.

Here, each of angles defined between the dynamic pressure grooves 71 to 74 and the circumferential direction is preferably in the range of 10° to 30° both inclusive. In this case, a force of the dynamic pressure obtained at each of the dynamic pressure grooves 71 to 74 can be efficiently increased. Further, each of the angles defined between the dynamic pressure grooves 71 to 74 and the circumferential direction is more preferably in the range of 18° to 22° both inclusive. When each of the angles defined between the dynamic pressure grooves 71 to 74 and the circumferential direction is set to about 20°, the force of the dynamic pressure obtained at each of the dynamic pressure grooves 71 to 74 can be particularly efficiently increased.

Referring to FIG. 7, while the spindle motor 11 is running, the rotating member 31 including the pumping dynamic pressure grooves 71 rotates in the circumferential direction (more specifically, in a direction indicated by a solid line arrow) with respect to the shaft 22. At this time, within each pumping dynamic pressure groove 71, the lubricating fluid 60 moves in a direction at an angle of $\alpha p[°]$ to the circumferential direction (i.e., in a direction indicated by a broken line arrow). As a result, one end of the pumping dynamic pressure groove 71 at a lower and one circumferential end thereof becomes a high dynamic pressure area 701, while an opposite end of the pumping dynamic pressure groove 71 at an upper and opposite circumferential end thereof becomes a low dynamic pressure area 702.

In addition, while the spindle motor 11 is running, within each striation 81, the lubricating fluid 60 moves along a length of the striation 81. In other words, within each striation 81, the lubricating fluid 60 moves in a direction at an angle of $\beta p[°]$ to the circumferential direction (i.e., in a direction indicated by a chain double-dashed line arrow).

If each striation 81 were arranged to extend along the circumferential direction as in a known groove, a direction in which the lubricating fluid 60 moves within the striation 81 and a direction in which the lubricating fluid 60 moves outside of each striation 81 within the pumping dynamic pressure groove 71 would be at an angle of $\alpha p[°]$ to each other. In this case, a flow of the lubricating fluid 60 within the striation 81 would hinder an axial movement of the lubricating fluid 60 outside of the striation 81. Accordingly, it would be difficult to improve the force of the dynamic pressure produced by the pumping dynamic pressure groove 71.

In each of the pumping dynamic pressure grooves 71 according to the present preferred embodiment, each striation 81 is arranged to extend obliquely with respect to the circumferential direction, and therefore, the lubricating fluid 60 moves both in the circumferential direction and in the axial direction within the striation 81. This contributes to preventing a flow of the lubricating fluid 60 within the striation 81 from easily hindering an axial movement of the lubricating fluid 60 outside of the striation 81.

Specifically, in each pumping dynamic pressure groove 71 according to the present preferred embodiment, an angle $\theta p$ defined between the direction in which the lubricating fluid 60 moves within each striation 81 and the direction in which the lubricating fluid 60 moves outside of the striation 81 within the pumping dynamic pressure groove 71 is $\alpha p - \beta p[°]$, which is smaller than $\alpha p[°]$ in the case of a known groove. In other words, the angle $\theta p$ defined between the direction in which the lubricating fluid 60 moves within each striation 81 and the direction in which the lubricating fluid 60 moves outside of the striation 81 within the pumping dynamic pressure groove 71 is closer to $0[°]$ than in the case where the striation 81 is arranged to extend along the circumferential direction. This contributes to preventing a flow of the lubricating fluid 60 within the pumping dynamic pressure groove 71 from being easily hindered by the striation 81.

Accordingly, the lubricating fluid 60 easily moves from the low dynamic pressure area 702 toward the high dynamic pressure area 701 in each pumping dynamic pressure groove 71. Thus, the force of the dynamic pressure produced by the pumping dynamic pressure groove 71 is improved. Note that, more preferably, αp[°] and βp[°] are substantially equal to each other. In this case, within each pumping dynamic pressure groove 71, a direction of a flow of the lubricating fluid within each striation 81 and a direction of a flow of the lubricating fluid outside of each striation 81 are substantially identical to each other. Therefore, the flow of the lubricating fluid within each striation 81 does not hinder the flow of the lubricating fluid outside of each striation 81.

Here, referring to FIGS. 7 and 8, both widthwise ends of each striation 81 will be each referred to as an edge portion 811. A portion of each striation 81 which is the deepest with respect to the depth direction of the pumping dynamic pressure groove 71 will be referred to as a deepest portion 812. Then, referring to FIG. 8, a distance from the inner circumferential surface of the rotating member 31, in which the pumping dynamic pressure grooves 71 are defined, to the deepest portion 812 of each striation 81 in the depth direction of the pumping dynamic pressure groove 71 will be referred to as a depth D1 of the pumping dynamic pressure groove 71. A distance from the edge portion 811 to the deepest portion 812 in the depth direction of the pumping dynamic pressure groove 71 will be referred to as a depth D2 of the striation 81. The depth D2 of the striation 81 as measured from the edge portion 811 is smaller than the depth D1 of the pumping dynamic pressure groove 71. According to the present preferred embodiment, the depth D2 of the striation 81 is sufficiently small, specifically, a third of the depth D1 of the pumping dynamic pressure groove 71 or smaller.

Arranging the depth D2 of the striation 81 to be smaller than the depth D1 of the pumping dynamic pressure groove 71 contributes to reducing an effect which the flow of the lubricating fluid 60 within the striation 81 produces on the flow of the lubricating fluid 60 outside of the striation 81, which is a large flow of the lubricating fluid 60 in the pumping dynamic pressure groove 71. Accordingly, the force of the dynamic pressure produced by the pumping dynamic pressure groove 71 can be further improved. That is, a reduction in a bearing loss of the fluid dynamic bearing 6 and an improvement in bearing rigidity can be achieved.

Similarly, depths of the striations 821, 822, and 83, which will be described below, are smaller than depths of dynamic pressure grooves 721 and 722 and the dynamic pressure grooves 73, respectively, in which the striations 821, 822, and 83, respectively, are defined.

Referring to FIG. 9, the radial dynamic pressure grooves 72 are dynamic pressure grooves arranged in a so-called herringbone pattern, and each radial dynamic pressure groove 72 includes a first dynamic pressure groove 721 angled in one circumferential direction with decreasing height, and a second dynamic pressure groove 722 angled in an opposite circumferential direction with decreasing height.

Each of the radial dynamic pressure grooves 72 according to the present preferred embodiment further includes a joining groove 723 arranged to extend in the vertical direction. The joining groove 723 is arranged to join a lower end portion of the first dynamic pressure groove 721 and an upper end portion of the second dynamic pressure groove 722 to each other. In other words, an end portion of the first dynamic pressure groove 721 at one circumferential end and an end portion of the second dynamic pressure groove 722 at one circumferential end are joined to each other through the joining groove 723. The joining groove 723 includes a first joining portion 724 including an upper end of the joining groove 723, and a second joining portion 725 including a lower end of the joining groove 723.

The striations 821 are defined in bottom portions of the first dynamic pressure groove 721 and the first joining portion 724. Meanwhile, the striations 822 are defined in bottom portions of the second dynamic pressure groove 722 and the second joining portion 725.

The first dynamic pressure groove 721 is arranged to extend in a direction at an angle of α1[°] to the circumferential direction. The second dynamic pressure groove 722 is arranged to extend in a direction at an angle of α2[°] to the circumferential direction. In addition, each striation 821 is arranged to extend in a direction at an angle of β1[°] to the circumferential direction. Each striation 822 is arranged to extend in a direction at an angle of β2[°] to the circumferential direction. Note that each of α1[°], α2[°], β1 [°], and β2[°] is greater than 0[°].

Referring to FIG. 9, while the spindle motor 11 is running, the rotating member 31 including the radial dynamic pressure grooves 72 rotates in the circumferential direction (more specifically, in a direction indicated by a solid line arrow) with respect to the shaft 22. At this time, within each first dynamic pressure groove 721, the lubricating fluid 60 moves in a direction at an angle of α1[°] to the circumferential direction (i.e., in a direction indicated by an upper broken line arrow). Meanwhile, within each second dynamic pressure groove 722, the lubricating fluid 60 moves in a direction at an angle of α2[°] to the circumferential direction (i.e., in a direction indicated by a lower broken line arrow). As a result, an area including an end portion of the first dynamic pressure groove 721 at a lower and one circumferential end thereof, the joining groove 723, and an end portion of the second dynamic pressure groove 722 at an upper and one circumferential end thereof becomes a high dynamic pressure area 701 in which a higher dynamic pressure is produced than in other areas. Meanwhile, each of an area including an end portion of the first dynamic pressure groove 721 at an upper and opposite circumferential end thereof and an area including an end portion of the second dynamic pressure groove 722 at a lower and opposite circumferential end thereof becomes a low dynamic pressure area 702.

Meanwhile, while the spindle motor 11 is running, within each striation 821, the lubricating fluid 60 moves in a direction at an angle of β1[°] to the circumferential direction (i.e., in a direction indicated by an upper chain double-dashed line arrow). Meanwhile, within each striation 822, the lubricating fluid 60 moves in a direction at an angle of β2[°] to the circumferential direction (i.e., in a direction indicated by a lower chain double-dashed line arrow).

Thus, in the radial dynamic pressure groove 72, an angle θ1 defined between the direction in which the lubricating fluid 60 moves in each striation 821 and the direction in which the lubricating fluid 60 moves outside of each striation 821 within the first dynamic pressure groove 721 is α1−β1[°], which is smaller than α1[°] in the case of a known groove. In other words, the angle θ1 defined between the direction in which the lubricating fluid 60 moves within each striation 821 and the direction in which the lubricating fluid 60 moves outside of the striation 821 within the first dynamic pressure groove 721 is closer to 0[°] than in the case where the striation 821 is arranged to extend along the circumferential direction. This contributes to preventing a flow of the lubricating fluid 60 within the radial dynamic pressure groove 72 from being easily hindered by the striation 821. Accordingly, the lubricating fluid 60 easily moves from the low dynamic pressure area 702 toward the high dynamic pressure area 701 in each radial dynamic pressure groove 72. Thus, a force of a dynamic pressure produced by the first dynamic pressure groove 721 is improved.

In addition, while the spindle motor 11 is running, an angle θ2 defined between a direction in which the lubricating fluid 60 moves in each striation 822 and a direction in which the lubricating fluid 60 moves outside of each striation 822 within the second dynamic pressure groove 722 is α2−β2[°], which is smaller than α2[°] in the case of a known groove. In other words, the angle θ2 defined between the direction in which the lubricating fluid 60 moves within each striation 822 and the direction in which the lubricating fluid 60 moves outside of the striation 822 within the second dynamic pressure groove 722 is closer to 0[°] than in the case where the striation 822 is arranged to extend along the circumferential direction. This contributes to preventing the flow of the lubricating fluid 60 within the radial dynamic pressure groove 72 from being easily hindered by the striation 822. Accordingly, the lubricating fluid 60 easily moves from the low dynamic pressure area 702 toward the high dynamic pressure area 701 in each radial dynamic pressure groove 72. Thus, a force of a dynamic pressure produced by the second dynamic pressure groove 722 is improved.

In particular, according to the present preferred embodiment, the angle, α2[°], defined between the second dynamic pressure groove 722 and the circumferential direction and the angle, β2[°], defined between the striation 822 and the circumferential direction are equal to each other. In other words, the angle θ2 defined between the direction in which the lubricating fluid 60 moves within the striation 822 and the direction in which the lubricating fluid 60 moves outside of each striation 822 within the second dynamic pressure groove 722 is 0[°]. Therefore, the direction in which the lubricating fluid 60 moves within the second dynamic pressure groove 722 while the spindle motor 11 is running is the same within and outside of each striation 822. Accordingly, the flow of the lubricating fluid within each striation 822 does not hinder the flow of the lubricating fluid outside of each striation 822. Thus, the force of the dynamic pressure produced by the second dynamic pressure groove 722 is further improved.

Referring to FIG. 10, each first thrust dynamic pressure groove 73 is arranged to extend in a direction at an angle of αs[°], which is greater than 0[°], to the circumferential direction. Note that, when an angle to the circumferential direction is mentioned in connection with dynamic pressure grooves defined in planes perpendicular to the central axis 9, such as, for example, the first thrust dynamic pressure grooves 73 and the second thrust dynamic pressure grooves 74, the angle to the circumferential direction is an angle of tangent. Meanwhile, each striation 83 is arranged to extend in a direction at an angle of βs[°], which is greater than 0[°] and equal to or smaller than αs[°], to the circumferential direction.

While the spindle motor 11 is running, the rotating member 31 rotates in the circumferential direction with respect to the shaft 22 including the first thrust dynamic pressure grooves 73. As a result, within each first thrust dynamic pressure groove 73, the lubricating fluid 60 moves in a direction at an angle of αs[°] to the circumferential direction (i.e., in a direction indicated by a broken line arrow). As a result, an end portion of the first thrust dynamic pressure groove 73 at a radially inner and one circumferential end thereof becomes a high dynamic pressure area 701, while an end portion of the first thrust dynamic pressure groove 73 at a radially outer and opposite circumferential end thereof becomes a low dynamic pressure area 702.

In addition, while the spindle motor 11 is running, within each striation 83, the lubricating fluid 60 moves along a length of the striation 83. In other words, within each striation 83, the lubricating fluid 60 moves in a direction at an angle of βs[°] to the circumferential direction (i.e., in a direction indicated by a chain double-dashed line arrow).

In each first thrust dynamic pressure groove 73, an angle θs defined between a direction in which the lubricating fluid 60 moves within each striation 83 and a direction in which the lubricating fluid 60 moves outside of each striation 83 within the first thrust dynamic pressure groove 73 is αs−βs[°], which is smaller than αs[°] in the case of a known groove. In other words, the angle θs defined between the direction in which the lubricating fluid 60 moves within each striation 83 and the direction in which the lubricating fluid 60 moves outside of the striation 83 within the first thrust dynamic pressure groove 73 is closer to 0[°] than in the case where the striation 83 is arranged to extend along the circumferential direction. This contributes to preventing a flow of the lubricating fluid 60 within the first thrust dynamic pressure groove 73 from being easily hindered by the striation 83. Accordingly, the lubricating fluid 60 easily moves from the low dynamic pressure area 702 toward the high dynamic pressure area 701 in each first thrust dynamic pressure groove 73. Thus, a force of a dynamic pressure produced by the first thrust dynamic pressure groove 73 is improved.

In particular, according to the present preferred embodiment, the angle, αs[°], defined between the first thrust dynamic pressure groove 73 and the circumferential direction and the angle, βs[°], defined between the striation 83 and the circumferential direction are equal to each other. Therefore, the direction in which the lubricating fluid 60 moves within the first thrust dynamic pressure groove 73 while the spindle motor 11 is running is the same within and outside of each striation 83. Thus, the force of the dynamic pressure produced by the first thrust dynamic pressure groove 73 is further improved.

Referring to FIG. 10, a circumferential width W1 of the high dynamic pressure area 701 of the first thrust dynamic pressure groove 73 is larger than a circumferential width W2 of the low dynamic pressure area 702 of the first thrust dynamic pressure groove 73. Accordingly, a force of a dynamic pressure produced in the lubricating fluid 60 in the high dynamic pressure area 701 tends to be easily increased because a circumferential width of the first thrust dynamic pressure groove 73 decreases as the lubricating fluid 60 moves from the low dynamic pressure area 702 toward the high dynamic pressure area 701. Thus, the force of the dynamic pressure produced by the first thrust dynamic pressure groove 73 is improved.

As described above, the dynamic pressure grooves 71 to 74 of the fluid dynamic bearing 6 have various features to improve the forces of the dynamic pressures produced thereby. Thus, a reduction in the bearing loss of the fluid dynamic bearing 6 and an improvement in the bearing rigidity can be achieved.

While preferred embodiments of the present invention have been described above, it will be understood that the present invention is not limited to the above-described preferred embodiments.

Figure 11:
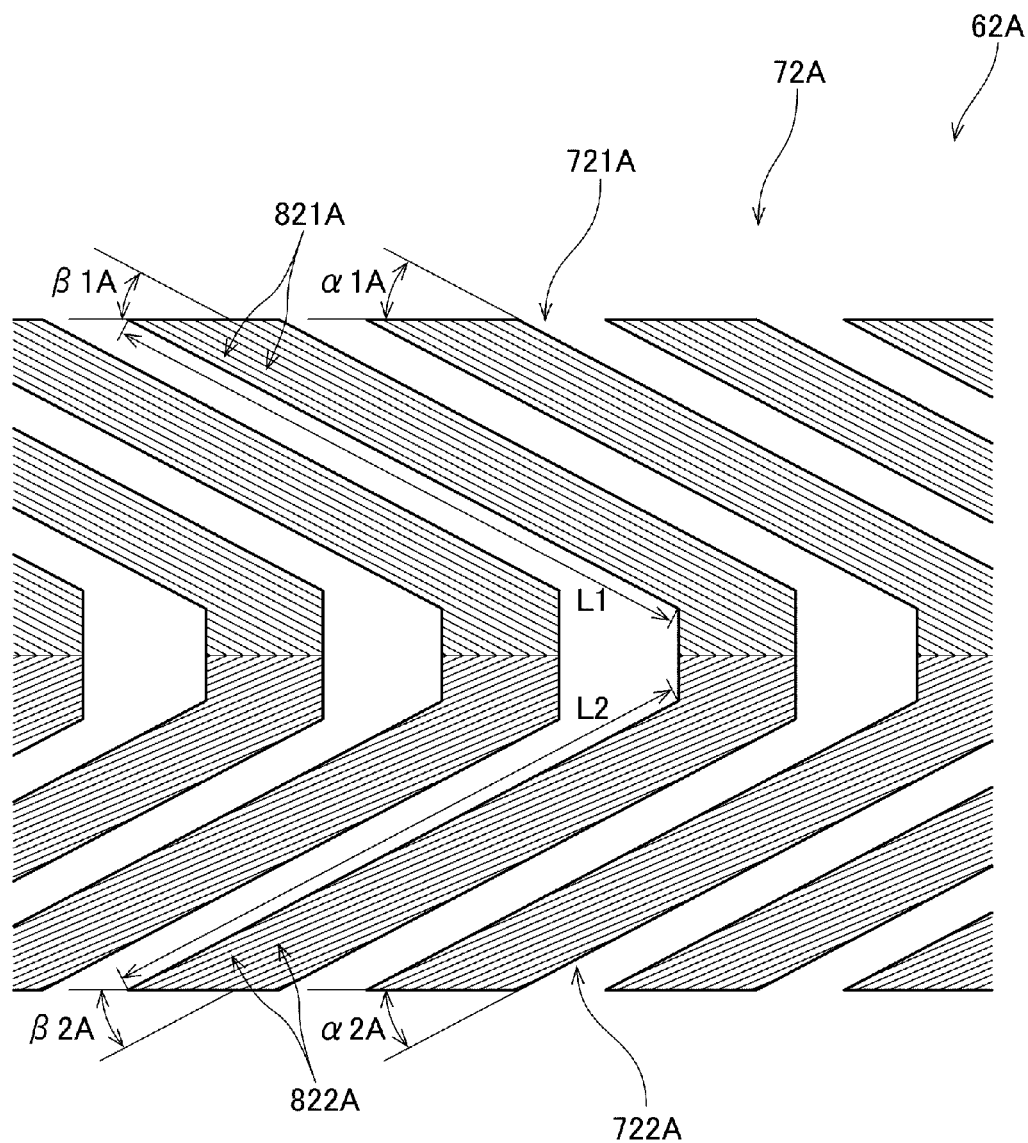
FIG. 11 is a side view of herringbone grooves according to a modification of the above preferred embodiment of the present invention.

FIG. 11 is a diagram illustrating a portion of a radial dynamic pressure groove array 62A according to a modification of the above-described preferred embodiment of the present invention. Radial dynamic pressure grooves 72A which define the radial dynamic pressure groove array 62A are dynamic pressure grooves arranged in a so-called herringbone pattern, and each radial dynamic pressure groove 72A includes a first dynamic pressure groove 721A angled in one circumferential direction with decreasing height, and a second dynamic pressure groove 722A angled in an opposite circumferential direction with decreasing height.

A plurality of first striations 821A are defined in a bottom portion of the first dynamic pressure groove 721A. A plurality of second striations 822A are defined in a bottom portion of the second dynamic pressure groove 722A. Each of these striations 821A and 822A is a groove recessed in a depth direction of the first dynamic pressure groove 721A or the second dynamic pressure groove 722A, and is arranged to extend obliquely with respect to the circumferential direction.

In the modification illustrated in FIG. 11, an angle, α1A[°], defined between the first dynamic pressure groove 721A and the circumferential direction and an angle, α2A[°], defined between the second dynamic pressure groove 722A and the circumferential direction are equal to each other. In addition, a length L1 of the first dynamic pressure groove 721A and a length L2 of the second dynamic pressure groove 722A are equal to each other. Meanwhile, an angle, β1A[°], defined between the first striation 821A and the circumferential direction and an angle, β2A[°], defined between the second striation 822A and the circumferential direction are different from each other. Accordingly, a force of a dynamic pressure produced by the first dynamic pressure groove 721A and a force of a dynamic pressure produced by the second dynamic pressure groove 722A are different from each other.

In the above-described preferred embodiment, the angle, α1[°], defined between the first dynamic pressure groove 721 and the circumferential direction and the angle, α2[°], defined between the second dynamic pressure groove 722 and the circumferential direction are arranged to be different from each other. Moreover, a length of the first dynamic pressure groove 721 and a length of the second dynamic pressure groove 722 are arranged to be different from each other. The force of the dynamic pressure produced by the first dynamic pressure groove 721 and the force of the dynamic pressure produced by the second dynamic pressure groove 722 are thus arranged to be different from each other. As a result, the force of the dynamic pressure produced by the first dynamic pressure groove 721 and the force of the dynamic pressure produced by the second dynamic pressure groove 722 can be produced in a desired balance.

In contrast, in the modification illustrated in FIG. 11, instead of the shape of each of the first dynamic pressure groove 721A and the second dynamic pressure groove 722A, the angle, β1A[°], defined between the first striation 821A defined in the bottom portion of the first dynamic pressure groove 721A and the circumferential direction and the angle, β2A[°], defined between the second striation 822A defined in the bottom portion of the second dynamic pressure groove 722A and the circumferential direction are adjusted to produce the force of the dynamic pressure produced by the first dynamic pressure groove 721A and the force of the dynamic pressure produced by the second dynamic pressure groove 722A in a desired balance.

Figure 12:
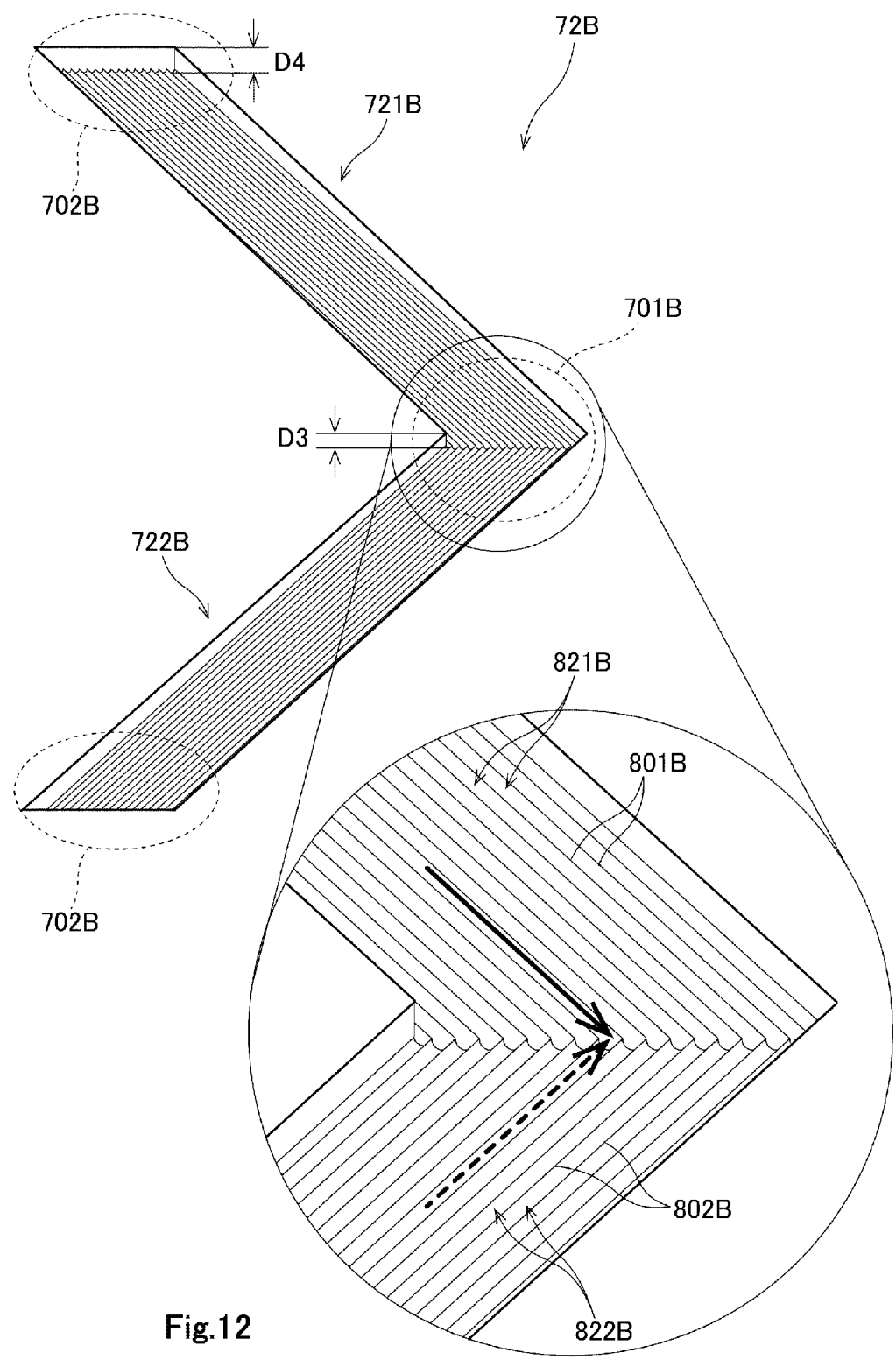
FIG. 12 is a side view of a herringbone groove according to a modification of the above preferred embodiment of the present invention.

FIG. 12 is a diagram illustrating a radial dynamic pressure groove 72B according to another modification of the above-described preferred embodiment of the present invention. Radial dynamic pressure grooves 72B are dynamic pressure grooves arranged in a so-called herringbone pattern, and each radial dynamic pressure groove 72B includes a first dynamic pressure groove 721B angled in one circumferential direction with decreasing height, and a second dynamic pressure groove 722B angled in an opposite circumferential direction with decreasing height. In the modification illustrated in FIG. 12, an end portion of the first dynamic pressure groove 721B at one circumferential end and an end portion of the second dynamic pressure groove 722B at one circumferential end are directly joined to each other.

An area including an end portion of the first dynamic pressure groove 721B at a lower and one circumferential end thereof and an end portion of the second dynamic pressure groove 722B at an upper and one circumferential end thereof, that is, an area including a junction of the first dynamic pressure groove 721B and the second dynamic pressure groove 722B, becomes a high dynamic pressure area 701B in which a higher dynamic pressure is produced than in other areas while a spindle motor is running. Meanwhile, each of an area including an end portion of the first dynamic pressure groove 721B at an upper and opposite circumferential end thereof and an area including an end portion of the second dynamic pressure groove 722B at a lower and opposite circumferential end thereof becomes a low dynamic pressure area 702B.

A plurality of first striations 821B are defined in a bottom portion of the first dynamic pressure groove 721B. A plurality of second striations 822B are defined in a bottom portion of the second dynamic pressure groove 722B. Each of these striations 821B and 822B is a groove recessed in a depth direction of the first dynamic pressure groove 721B or the second dynamic pressure groove 722B, and is arranged to extend obliquely with respect to the circumferential direction.

In the modification illustrated in FIG. 12, a circumferential position of an end portion of the first striation 821B at one circumferential end, and a circumferential position of an end portion of a corresponding one of the second striations 822B at one circumferential end coincide with each other. In other words, at a junction of the first striation 821B and the second striation 822B, a circumferential position of an edge portion 801B of the first striation 821B and a circumferential position of an edge portion 802B of the second striation 822B coincide with each other.

As a result, while the spindle motor is running, a flow of a lubricating fluid traveling downward and in one circumferential direction within the first striation 821B as indicated by a solid line arrow in FIG. 12, and a flow of a lubricating fluid traveling upward and in one circumferential direction within the second striation 822B as indicated by a broken line arrow in FIG. 12 collide with each other at the junction of the first striation 821B and the second striation 822B. This contributes to increasing a force of a dynamic pressure produced at the high dynamic pressure area 701B. That is, a force of a dynamic pressure produced by the radial dynamic pressure groove 72B can be improved.

In addition, in the modification illustrated in FIG. 12, a depth D3 of the first dynamic pressure groove 721B at the high dynamic pressure area 701B is smaller than a depth D4 of the first dynamic pressure groove 721B at the low dynamic pressure area 702B. As a result, a gap between a member opposed to the first dynamic pressure groove 721B and the bottom portion of the first dynamic pressure groove 721B is narrower in an area where the first dynamic pressure groove 721B has the depth D3 than in an area where the first dynamic pressure groove 721B has the depth D4. Accordingly, while the spindle motor is running, pressure of a lubricating fluid 60B tends to become increased as the lubricating fluid 60B travels from the low dynamic pressure area 702B toward the high dynamic pressure area 701B within the first dynamic pressure groove 721B. Accordingly, a force of a dynamic pressure produced by the first dynamic pressure groove 721B can be further improved.

Similarly, regarding the second dynamic pressure groove 722B, a depth D3 of the second dynamic pressure groove 722B at the high dynamic pressure area 701B is smaller than a depth (not shown) of the second dynamic pressure groove 722B at the low dynamic pressure area 702B. Accordingly, a force of a dynamic pressure produced by the second dynamic pressure groove 722B can be further improved. Accordingly, the force of the dynamic pressure produced by the radial dynamic pressure groove 72B as a whole can be further improved.

Figure 13:
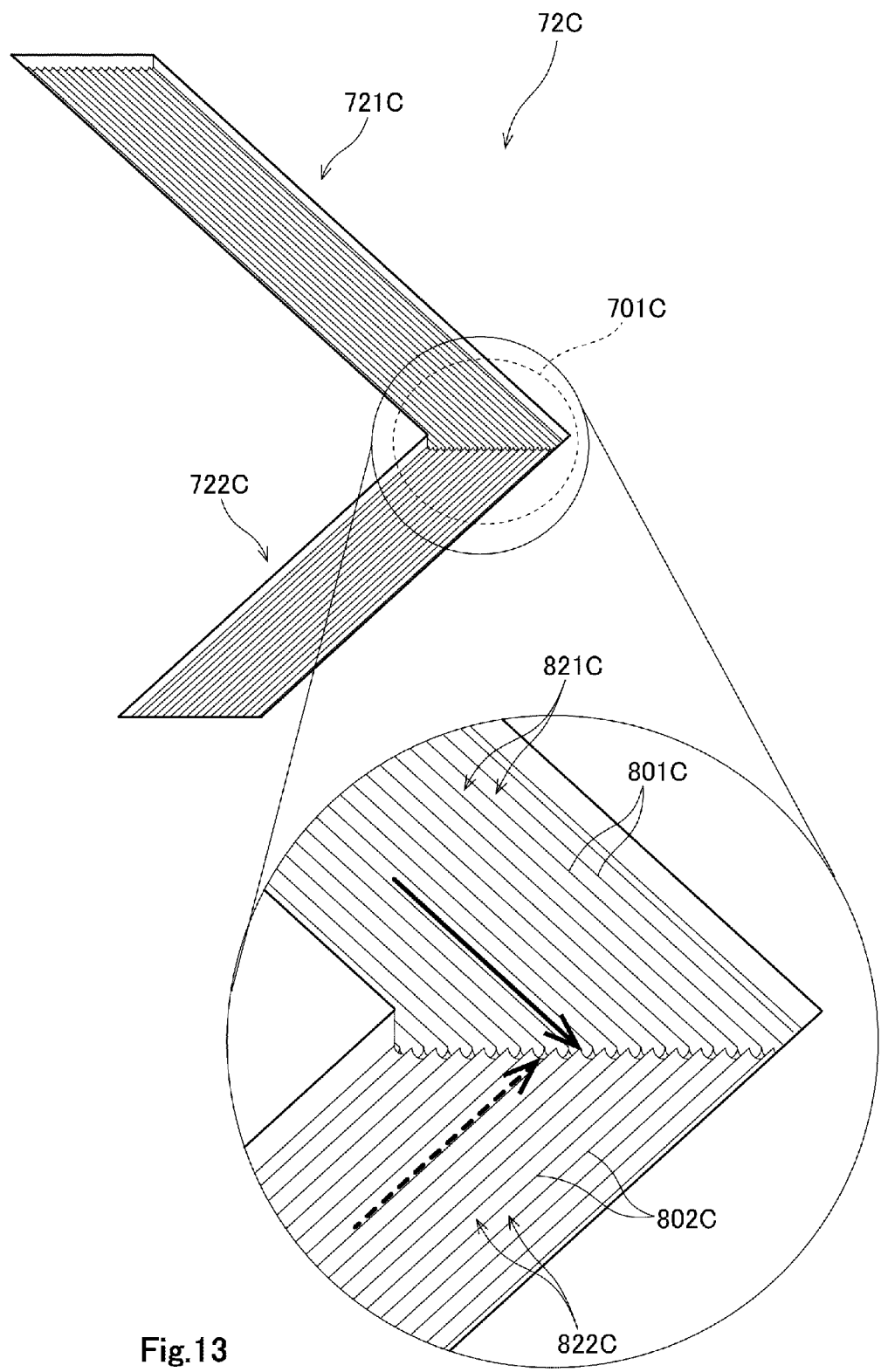
FIG. 13 is a side view of a herringbone groove according to a modification of the above preferred embodiment of the present invention.

FIG. 13 is a diagram illustrating a radial dynamic pressure groove 72C according to yet another modification of the above-described preferred embodiment of the present invention. Radial dynamic pressure grooves 72C are dynamic pressure grooves arranged in a so-called herringbone pattern, and each radial dynamic pressure groove 72C includes a first dynamic pressure groove 721C angled in one circumferential direction with decreasing height, and a second dynamic pressure groove 722C angled in an opposite circumferential direction with decreasing height. In the modification illustrated in FIG. 13, an end portion of the first dynamic pressure groove 721C at one circumferential end and an end portion of the second dynamic pressure groove 722C at one circumferential end are directly joined to each other.

An area including a junction of the first dynamic pressure groove 721C and the second dynamic pressure groove 722C becomes a high dynamic pressure area 701C in which a higher dynamic pressure is produced than in other areas while a spindle motor is running.

A plurality of first striations 821C are defined in a bottom portion of the first dynamic pressure groove 721C. A plurality of second striations 822C are defined in a bottom portion of the second dynamic pressure groove 722C. Each of these striations 821C and 822C is a groove recessed in a depth direction of the first dynamic pressure groove 721C or the second dynamic pressure groove 722C, and is arranged to extend obliquely with respect to the circumferential direction.

In the modification illustrated in FIG. 13, a circumferential position of an edge portion 801C of each first striation 821C at an end portion of the first striation 821C at one circumferential end is substantially in a middle of a circumferential position of an end portion of a corresponding one of the second striations 822C at one circumferential end. That is, at junctions of the first striations 821C and the second striations 822C, circumferential positions of the edge portions 801C of the first striations 821C and circumferential positions of edge portions 802C of the second striations 822C are alternately arranged and substantially evenly spaced.

Accordingly, a flow of a lubricating fluid traveling downward and in one circumferential direction within each first striation 821C as indicated by a solid line arrow in FIG. 13 collides against an end surface of the edge portion 802C of a corresponding one of the second striations 822C at an upper and one circumferential end thereof. In addition, a flow of a lubricating fluid traveling upward and in one circumferential direction within each second striation 822C as indicated by a broken line arrow in FIG. 13 collides against an end surface of the edge portion 801C of a corresponding one of the first striations 821C at a lower and one circumferential end thereof. This contributes to increasing a force of a dynamic pressure produced at the high dynamic pressure area 701C. That is, a force of a dynamic pressure produced by the radial dynamic pressure groove 72C can be improved.

Figure 14:
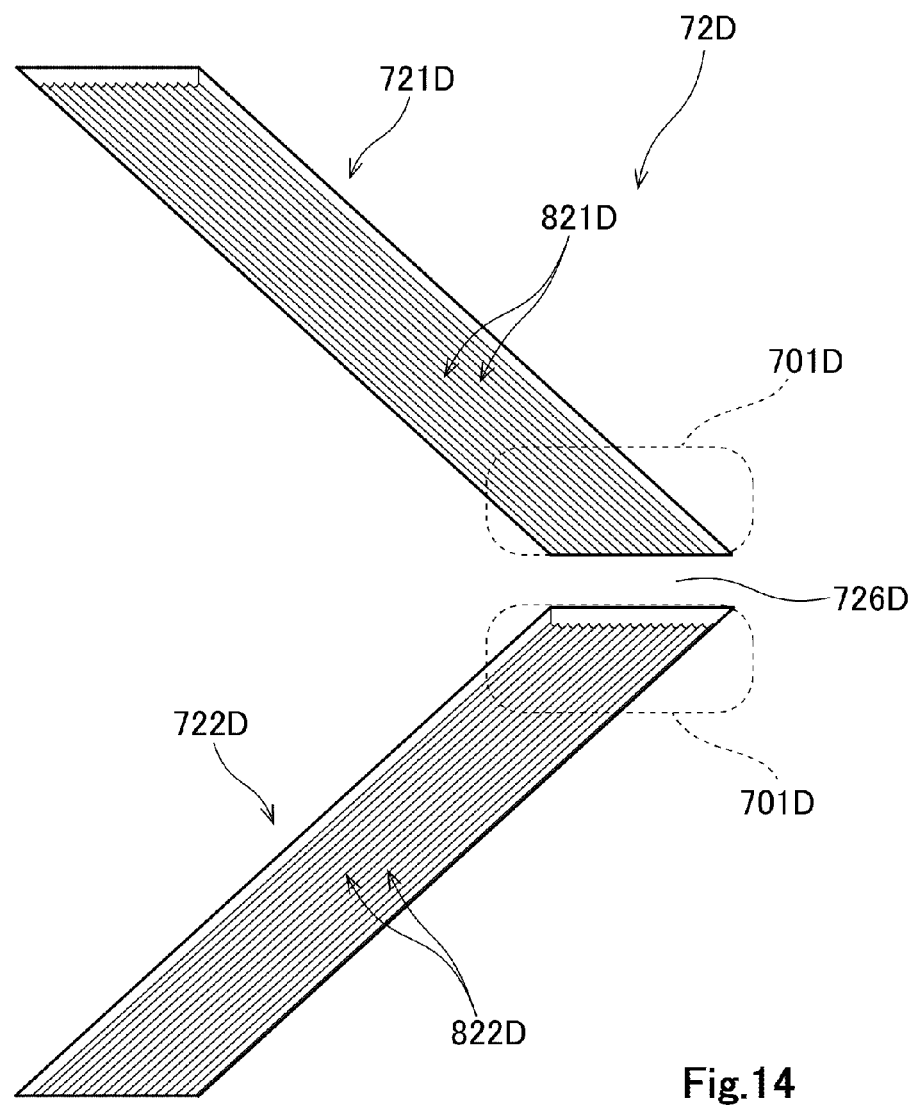
FIG. 14 is a side view of a herringbone groove according to a modification of the above preferred embodiment of the present invention.

FIG. 14 is a diagram illustrating a radial dynamic pressure groove 72D according to yet another modification of the above-described preferred embodiment of the present invention. The radial dynamic pressure groove 72D includes a first dynamic pressure groove 721D angled in one circumferential direction with decreasing height, and a second dynamic pressure groove 722D angled in an opposite circumferential direction with decreasing height. An end portion of the first dynamic pressure groove 721D at a lower and one circumferential end thereof, and an end portion of the second dynamic pressure groove 722D at an upper and one circumferential end thereof are axially spaced from each other. In other words, the radial dynamic pressure groove 72D according to the modification illustrated in FIG. 14 is a dynamic pressure groove arranged in a modified herringbone pattern, with the first dynamic pressure groove 721D and the second dynamic pressure groove 722D being divided by a hill portion 726D.

A plurality of first striations 821D are defined in a bottom portion of the first dynamic pressure groove 721D. A plurality of second striations 822D are defined in a bottom portion of the second dynamic pressure groove 722D. Each of these striations 821D and 822D is a groove recessed in a depth direction of the first dynamic pressure groove 721D or the second dynamic pressure groove 722D, and is arranged to extend obliquely with respect to the circumferential direction.

Each of an area including the end portion of the first dynamic pressure groove 721D at the lower and one circumferential end thereof, and an area including the end portion of the second dynamic pressure groove 722D at the upper and one circumferential end thereof becomes a high dynamic pressure area 701D in which a higher dynamic pressure is produced than in other areas while a spindle motor is running.

While the spindle motor is running, a flow of a lubricating fluid traveling downward and in one circumferential direction occurs within the first dynamic pressure groove 721D. This flow of the lubricating fluid collides against the hill portion 726D at the end portion of the first dynamic pressure groove 721 at the lower and one circumferential end thereof. As a result, the lubricating fluid is gathered at a gap between the hill portion 726D and a member opposed to the hill portion 726D. As a result, a higher force of a dynamic pressure is obtained at the high dynamic pressure area 701D of the first dynamic pressure groove 721D and at the hill portion 726D.

Similarly, while the spindle motor is running, a flow of a lubricating fluid traveling upward and in one circumferential direction occurs within the second dynamic pressure groove 722D. This flow of the lubricating fluid collides against the hill portion 726D at the end portion of the second dynamic pressure groove 722 at the upper and one circumferential end thereof. This contributes to increasing a force of a dynamic pressure produced at the high dynamic pressure area 701D of the second dynamic pressure groove 722D. Accordingly, a force of a dynamic pressure produced by the radial dynamic pressure groove 72D as a whole can be further improved.

Note that spindle motors according to other preferred embodiments of the present invention may be motors arranged to rotate disks other than the magnetic disks, such as, for example, optical disks.

Also note that a fluid bearing apparatus according to a preferred embodiment of the present invention may be a fluid bearing apparatus used in a spindle motor having a structure different from that of the spindle motor according to the above-described preferred embodiment. Also note that a fluid bearing apparatus according to a preferred embodiment of the present invention may be a fluid bearing apparatus used in an apparatus which involves rotation but which is not a spindle motor.

Also note that the detailed shape of any member may be different from the shape thereof as illustrated in the accompanying drawings of the present invention. Also note that features of the above-described preferred embodiments and the modifications thereof may be combined appropriately as long as no conflict arises.

Preferred embodiments of the present invention are applicable to fluid bearing apparatuses, spindle motors, and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fluid bearing apparatus comprising:
   a stationary member including a bearing surface; and
   a rotating member arranged to rotate about a rotation axis with respect to the stationary member, and including a bearing surface; wherein
   the bearing surface of the stationary member and the bearing surface of the rotating member are arranged opposite to each other with a minute gap intervening therebetween, a lubricating fluid being arranged in the minute gap;
   at least one of the bearing surfaces includes:
      a dynamic pressure groove; and
         a plurality of striations defined in a bottom portion of the dynamic pressure groove;
   each of the plurality of striations is a groove recessed in a depth direction of the dynamic pressure groove;
   a depth of each striation as measured from an edge portion of the striation is smaller than a depth of the dynamic pressure groove;
   each of the dynamic pressure groove and the plurality of striations is arranged to extend in a direction at an angle greater than 0° to a circumferential direction;
   an angle defined between each striation and the circumferential direction is equal to or smaller than an angle defined between the dynamic pressure groove and the circumferential direction; and
   the angle defined between the dynamic pressure groove and the circumferential direction is in a range of 10° to 30° both inclusive.

2. The fluid bearing apparatus according to claim 1, wherein
   the angles defined between the plurality of striations and the circumferential direction are equal to one another; and
   edge portions of adjacent ones of the striations are arranged to overlap with each other.

3. The fluid bearing apparatus according to claim 1, wherein
   the dynamic pressure groove includes:
      a high dynamic pressure area arranged at an end portion of the dynamic pressure groove at one circumferential end; and
      a low dynamic pressure area arranged at an end portion of the dynamic pressure groove at an opposite circumferential end;
   while the rotating member is rotating, a higher dynamic pressure is produced in the high dynamic pressure area than in the low dynamic pressure area; and
   a circumferential width of the high dynamic pressure area is smaller than a circumferential width of the low dynamic pressure area.

4. The fluid bearing apparatus according to claim 3, wherein
   a depth of the dynamic pressure groove is smaller in the high dynamic pressure area than in the low dynamic pressure area.

5. The fluid bearing apparatus according to claim 1, wherein
   the dynamic pressure groove includes:
      a high dynamic pressure area arranged at an end portion of the dynamic pressure groove at one circumferential end; and
      a low dynamic pressure area arranged at an end portion of the dynamic pressure groove at an opposite circumferential end;
   while the rotating member is rotating, a higher dynamic pressure is produced in the high dynamic pressure area than in the low dynamic pressure area; and
   a depth of the dynamic pressure groove is smaller in the high dynamic pressure area than in the low dynamic pressure area.

6. The fluid bearing apparatus according to claim 1, wherein the angle defined between the dynamic pressure groove and the circumferential direction is in a range of 18° to 22° both inclusive.

7. The fluid bearing apparatus according to claim 1, wherein the angle defined between the dynamic pressure groove and the circumferential direction is equal to the angle defined between each striation and the circumferential direction.

8. The fluid bearing apparatus according to claim 1, wherein
   the dynamic pressure groove is arranged in a herringbone pattern, and includes:
      a first dynamic pressure groove angled in one circumferential direction; and
      a second dynamic pressure groove angled in an opposite circumferential direction;
   the plurality of striations include:
      a plurality of first striations defined in a bottom portion of the first dynamic pressure groove; and
      a plurality of second striations defined in a bottom portion of the second dynamic pressure groove; and
   an end portion of the first dynamic pressure groove at one circumferential end and an end portion of the second dynamic pressure groove at one circumferential end are joined to each other.

9. The fluid bearing apparatus according to claim 8, wherein
   an angle defined between the first dynamic pressure groove and the circumferential direction is equal to an angle defined between the second dynamic pressure groove and the circumferential direction; and
   an angle defined between each first striation and the circumferential direction is different from an angle defined between each second striation and the circumferential direction.

10. The fluid bearing apparatus according to claim 8, wherein a circumferential position of an end portion of each first striation at one circumferential end is arranged to coincide with a circumferential position of an end portion of a corresponding one of the second striations at one circumferential end.

11. The fluid bearing apparatus according to claim 8, wherein a circumferential position of an edge portion of each first striation at an end portion of the first striation at one circumferential end is substantially in a middle of a circumferential position of an end portion of a corresponding one of the second striations at one circumferential end.

12. The fluid bearing apparatus according to claim 1, wherein
   the dynamic pressure groove includes:
      a first dynamic pressure groove angled in one circumferential direction; and
      a second dynamic pressure groove angled in an opposite circumferential direction;
   the plurality of striations include:
      a plurality of first striations defined in a bottom portion of the first dynamic pressure groove; and a plurality of second striations defined in a bottom portion of the second dynamic pressure groove; and an end portion of the first dynamic pressure groove at one circumferential end and an end portion of the second dynamic pressure groove at one circumferential end are spaced from each other.

13. A spindle motor comprising:

the fluid bearing apparatus according to claim 1;

a rotating portion including the rotating member and a magnet; and a stationary portion including the stationary member, a stator including a plurality of coils, and a base plate.

14. A disk drive apparatus comprising:

the spindle motor according to claim 13;

an access portion arranged to perform at least one of reading and writing of information from or to a disk supported by the rotating portion of the spindle motor; and a housing arranged to accommodate the spindle motor and the access portion.

* * * * *